(12) United States Patent
Oblack et al.

(10) Patent No.: US 8,474,410 B2
(45) Date of Patent: Jul. 2, 2013

(54) RESILIENT ANIMAL THROW-TOY WITH BUOYANT INTERIOR MEMBER

(75) Inventors: Mark J. Oblack, Issaquah, WA (US); Justin Bagley, Seattle, WA (US); Kyle Douglas Burger, Seattle, WA (US); Joseph W. Kent, Brooklyn, NY (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 14 days.

(21) Appl. No.: 12/029,409

(22) Filed: Feb. 11, 2008

(65) Prior Publication Data

US 2009/0199784 A1      Aug. 13, 2009

(51) Int. Cl.
*A01K 29/00*      (2006.01)

(52) U.S. Cl.
USPC ............................................ 119/709; 446/48

(58) Field of Classification Search
USPC ................ 119/707–711; 446/76, 48; 473/352
See application file for complete search history.

(56) References Cited

U.S. PATENT DOCUMENTS

| | | | |
|---|---|---|---|
| 4,253,672 A * | 3/1981 | Milzoff et al. | 473/588 |
| 4,503,635 A | 3/1985 | Harrington | |
| 5,035,425 A | 7/1991 | Edwards | |
| 5,484,159 A | 1/1996 | Dean | |
| 5,540,610 A * | 7/1996 | Sneddon | 446/46 |
| 5,904,118 A | 5/1999 | Markham | |
| 6,174,214 B1 | 1/2001 | Cooper | |
| 6,247,989 B1 | 6/2001 | Neff | |
| 6,415,740 B1 | 7/2002 | Curry | |
| 6,615,766 B1 | 9/2003 | Curry | |
| 6,918,355 B1 * | 7/2005 | Arvanites | 119/707 |
| 7,096,826 B2 | 8/2006 | Markham | |
| 2003/0157862 A1 * | 8/2003 | Dunn | 446/46 |
| 2004/0089245 A1 * | 5/2004 | Markham | 119/709 |
| 2006/0102098 A1 * | 5/2006 | Zelinger | 119/707 |
| 2006/0201446 A1 | 9/2006 | Edwards | |

OTHER PUBLICATIONS

Definition of "mold"; Merriam-Webster's Online Dictionary; retrieved from internet: 101/05/2010.*

* cited by examiner

*Primary Examiner* — Kristen C Hayes
(74) *Attorney, Agent, or Firm* — Eckert Seamans Cherin & Mellott, LLC; Brij K. Agarwal (57) ABSTRACT

An animal throw-toy of resilient construction is provided, comprising a buoyant interior member configured in the form of a distinct object shape, a fabric component that covers the buoyant interior member, and a molded component that also covers the buoyant interior member. The molded component is configurationally arranged relative to the buoyant interior member so as to gyroscopically stabilize the distinct object shape of the buoyant interior member when the throw-toy is thrown. In one embodiment, the fabric component of the throw-toy is a non-woven or woven material which is tear-resistant and the molded component is an elastomeric material which is abrasion-resistant.

12 Claims, 9 Drawing Sheets

RESILIENT ANIMAL THROW-TOY WITH BUOYANT INTERIOR MEMBER

BACKGROUND

Flying, buoyant throw-toys are desirable for pet owners who wish to exercise their animals in varying environments with minimal self-exertion. Running or swimming with an animal is not always a viable option for pet owners lacking the requisite physical capabilities consistent with such activities, as is the case for certain elderly or unconditioned pet owners. However, because running and swimming are both excellent forms of exercise for canines and other animals alike, it would be beneficial for less active pet owners to have a buoyant throw-toy with maximal flight capability with which to exercise their pet.

Unfortunately, many throw-toys today are not designed with sufficient structural integrity to withstand the repetitive biting force of an animal's teeth. A majority of buoyant throw-toys on the market today are easily destructible due to their low-density construction and lack of exterior protection. Likewise, many durable, non-buoyant throw-toys on the market are of such heavy construction as to significantly reduce their flight capability. These heavier toys require a significant throwing force to propel them a distance necessary to sufficiently exercise an animal during a game of fetch. Further, throw-toys with a plastic exterior construction have hard, slick surfaces that are not optimally suited to be grasped by an animal's teeth.

What is needed to remedy the above-noted deficiencies is a substantially durable, buoyant throw-toy of lightweight construction that can be propelled a considerable distance with an easy-to-moderate throwing force and is easily graspable by an animal's teeth.

SUMMARY

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In view of the inefficiencies associated with throw-toys on the market today, as discussed in the background section above, the inventor of the present application has devised a resilient, buoyant animal throw-toy which is capable of being thrown a considerable distance with minimal throwing force. This throw-toy is of a light-weight, durable construction and is configured in such a way as to prevent destruction from the applied biting force of an animal's teeth. The throw-toy's exterior material types and shape are designed to be easily grasped by an animal's teeth and claws such that when the throw-toy is found lying on the ground, the animal can easily pick it up and retrieve it.

In accordance with one embodiment of the present invention, an animal throw-toy of resilient construction is provided, comprising a buoyant interior member configured in the form of a distinct object shape, a fabric component covering the buoyant interior member, and a molded component also covering the buoyant interior member. The molded component is configurationally arranged relative to the buoyant interior member in order to gyroscopically stabilize the distinct object shape of the buoyant interior member when the throw-toy is thrown.

In accordance with one aspect of the present invention, the fabric component of the animal throw-toy covers only a portion of the buoyant interior member and the molded component covers the remaining portion thereof. In accordance with another aspect of the present invention, the fabric component is a woven or non-woven (e.g., felted) material which is tear-resistant and the molded component is an elastomeric material which is abrasion-resistant.

In accordance with another aspect of the present invention, the elastomeric material of the molded component is elastic enough to facilitate folding the animal throw-toy without tearing or causing a permanent deformation of the molded component.

In accordance with yet another aspect of the present invention, the buoyant interior member of the throw-toy is formed from a closed-cell foam of uniform density and the distinct object shape of the interior member is symmetrically shaped about an imaginary central axis.

In accordance with a further aspect of the present invention, both the fabric component and the molded component of the throw-toy are adhesively affixed to the buoyant interior member, and the fabric component and the molded component are sewn together such that the combined covering components completely enclose the buoyant interior member.

In accordance with another embodiment of the present invention, a resilient throw-toy which is adapted to be thrown and retrieved is provided. This throw-toy comprises a foam interior member configured in the form of a distinct object shape, a fabric tear-resistant component covering the foam interior member, and a molded abrasion-resistant component configurationally affixed to the foam interior member to cover portions along the peripheral edge of the distinct object shape of the foam interior member, all of which are designed for impact.

In accordance with one embodiment of the present invention, the fabric tear-resistant component, the molded abrasion-resistant component, and the foam interior member of the throw-toy are configured in a circular shape. In accordance with alternate embodiments of the present invention, the fabric tear-resistant component, the molded abrasion-resistant component, and the foam interior member are configured in the shape of either a boomerang or a boat fender.

In accordance with yet another aspect of the present invention, both the fabric tear-resistant component and the molded abrasion-resistant component are adhesively affixed to the foam interior member to prevent the foam interior member from being compressibly misaligned within the combined covering components.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
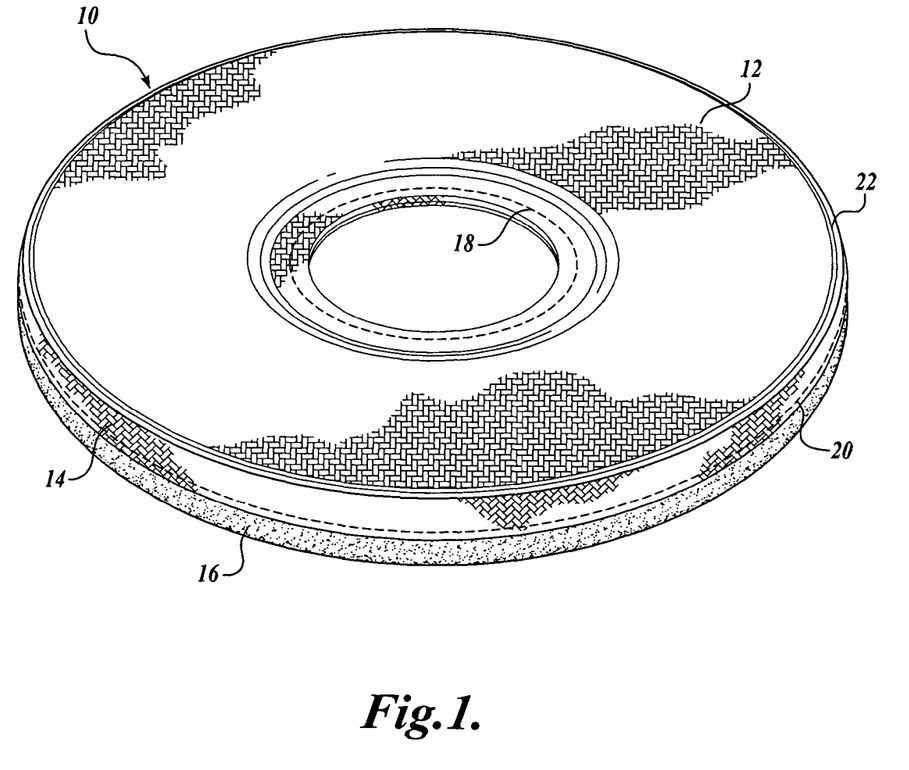
FIG. 1 is a perspective view of a buoyant, ring-shaped, flying throw-toy in accordance with a first embodiment of the present invention.
Figure 2:
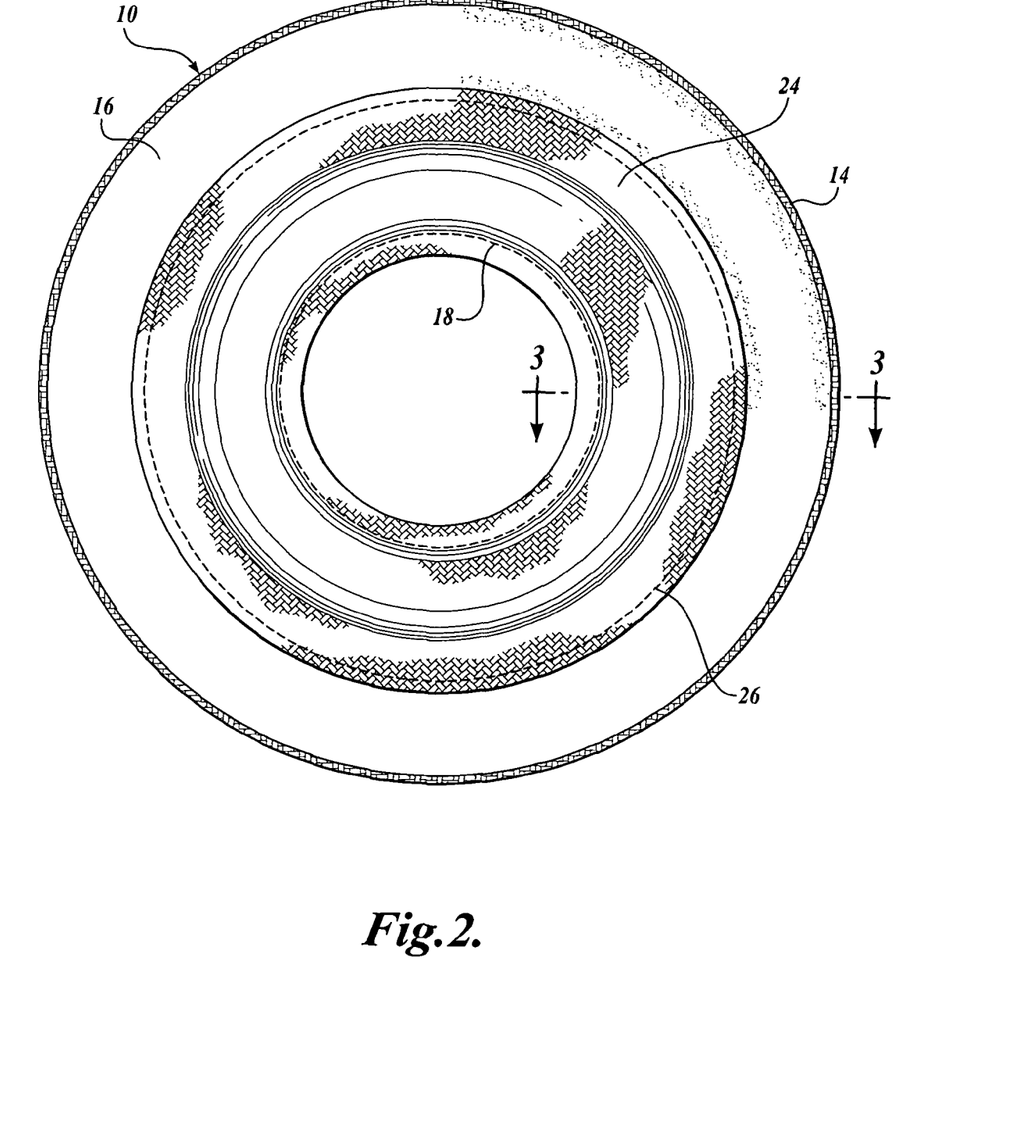
FIG. 2 is a bottom-side view thereof.
Figure 3:
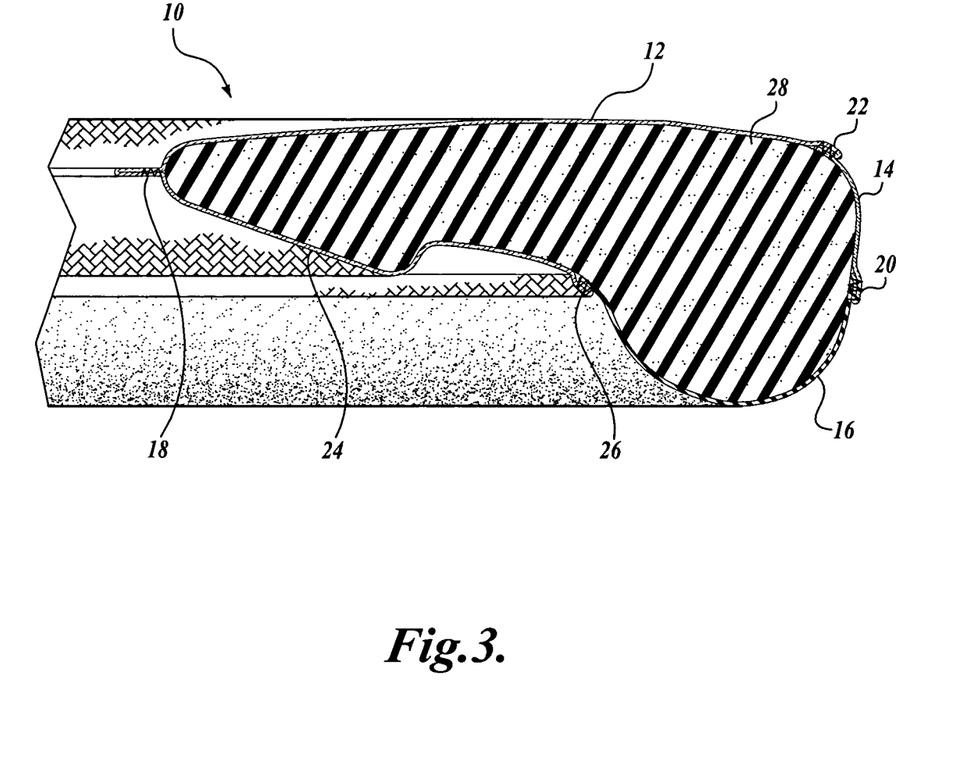
FIG. 3 is a partial cross-sectional view thereof.

In accordance with a first embodiment of the present invention, a flying, ring-shaped throw-toy 10 that is capable of flight when propelled with a forward spinning force is illustratively depicted in FIGS. 1-3. This throw-toy is comprised of the following three primary components: a fabric tear-resistant covering component, shown as a combination of covering components 12, 14, and 24 that are sewn together; a molded abrasion-resistant covering component 16, shown as sewn to the fabric covering components 14 and 24, and configurationally positioned along the peripheral edge of the throw-toy to gyroscopically stabilize the throw-toy during flight; and a buoyant interior member 28 that is completely covered by the combined fabric and molded covering components 12, 14, 24, and 16. In the present description, the terms "covering component," "component," and "member" are often used interchangeably.

The fabric tear-resistant covering components 12, 14, and 24 are of a selectable material type, such as a woven or non-woven fabric which comprises either natural or synthetic fibers, or combinations thereof. In one embodiment of the present invention, the covering material type is a non-woven felted natural-fiber blend. In another embodiment of the present invention, the covering material type is a woven nylon or polyester fabric. These selectable fabric material types are substantially resilient and able to withstand puncture and tear from an animal's teeth and claws. The molded, abrasion-resistant covering component 16 is molded and of a selectable elastomeric material type, including synthetic rubber, natural rubber, or combinations thereof. In one embodiment of the present invention the molded covering component 16 is made of thermoset natural rubber. The molded component 16 selectable material types are substantially abrasion resistant to withstand ground impact associated with landings, puncture-resistant to withstand the biting force of sharp animal teeth, and self-healing to recover from deformation. Self-healing properties include elastic-pliability combined with deformation-recovery. For example, when a self-healing object is stretched or deformed due to an exerted external biting force (e.g., the biting force of a dog's teeth), the object responds by returning to its original shape shortly after the force is removed. Self-healing recovery also includes fold-recovery, such that when the self-healing object is stretchably folded over onto itself, the object responds by unfolding itself and returning to its original shape when the folding force is removed. The buoyant interior member 28 is of a selectable material type, such as closed-cell foam of sufficient buoyancy to cause the throw-toy 10 to float in water. Samples of closed-cell foam which may be used in the present invention include EVA (Ethylene vinyl acetate) foam or Polyolefin foam.

Additional associated advantages of the selectable material types for the fabric covering components 12, 14, 24 and molded covering component 16 include grip and traction, such that the coverings are easily graspable by an animal's teeth and claws while the throw-toy is suspended in air, or on water, or is lying at rest on the ground. Further benefits associated with the selectable material type of the buoyant interior member 28 include deformation-recovery, such that the buoyant interior member can recover its shape after being temporarily deformed by an external biting or folding force.

It should be understood that the listing herein of selectable material types is not exhaustive, and many other material type selections are feasible, while still allowing the present invention to function as described. Further, the primary components and associated selectable material types are consistent amongst all embodiments of the present invention.

FIG. 1 illustrates a perspective view of the ring-shaped throw-toy 10 in accordance with the first embodiment of the present invention, wherein the throw-toy comprises a fabric tear-resistant top covering component 12 sewn to a fabric tear-resistant bottom covering component 24 (illustrated in FIG. 2) with durable stitchings 18. Further, the fabric tear-resistant side covering component 14 is sewn to the molded abrasion-resistant covering component 16 and the fabric tear-resistant top covering component 12 with durable stitchings 20 and 22, respectively. FIG. 2 illustrates a bottom view of the ring-shaped throw-toy of the present embodiment wherein the fabric tear-resistant bottom covering component 24 is sewn to both the fabric tear-resistant top covering component 12 and the molded abrasion-resistant component 16 with durable stitchings 18 and 26, respectively. FIG. 3 illustrates a partial cross-sectional view of the ring-shaped throw-toy wherein the buoyant interior member 28 is completely covered by sewn fabric and molded covering components 12, 14, 24, and 16, which are bound together with stitchings 18, 20, 22, and 26, such that none of the buoyant interior member remains uncovered.

Durable stitchings 18, 20, 22, and 26 are of a selectable material type, such as a synthetic thread, of sufficient tensile strength to resist breakage due to an external biting force. Samples of synthetic threads of sufficient tensile strength, which may be used in the present invention, include nylon or polyester threads, or combinations thereof. In accordance with one embodiment of the present invention a durable monofilament line is used as the stitching material type.

The buoyant interior member in one embodiment is adhesively bonded to both the fabric and molded covering components 12, 14, 24, and 16 in such a manner as to prevent the buoyant interior member 28 from independently moving about within the combined covering components (adhesive element not shown). In accordance with one aspect of the invention, a fabric scrim may be provided between any of the covering components 12, 14, 24, and 16 and the buoyant interior member 28, to provide better bonding surfaces for promoting improved adhesion strength. A scrim may be bonded to the molded component 16, during a bonding process (which may be simultaneous with a molding process) to provide the molded component with a superior surface with which to achieve a mechanical bond with the adhesive element. Samples of adhesive types, which may be used in accordance with the present invention, include the following: hot glues, latent reactive adhesives, contact cements, and various other types of water-based or solvent-based adhesives. One advantage of the adhesion is to secure all three primary components together while at the same time preventing the deformable interior member 28 from being compressibly misaligned within the sewn covering components 12, 14, 24, and 16. A further advantage of the adhesion is that when all the components of the throw-toy are adhesively bonded together, they act in unison to better recover shape after a deformation occurs.

This feature is particularly advantageous when the throw-toy is configured to include one or more elongate members, as seen in subsequent embodiments of the present invention (e.g., FIGS. 4-7 and 10-14). In these embodiments, if interior adhesion were not present, an elongate member of the buoyant interior member could conceivably be compressed and misaligned interior to the sewn covering components such that the elongate member no longer correctly fills its designated extremity covering component. The adhesion acts to prevent such misalignment and further tightly secures the covering components to the interior member to minimize aerodynamic resistance caused by loosely fitted covering components.

Figure 4:
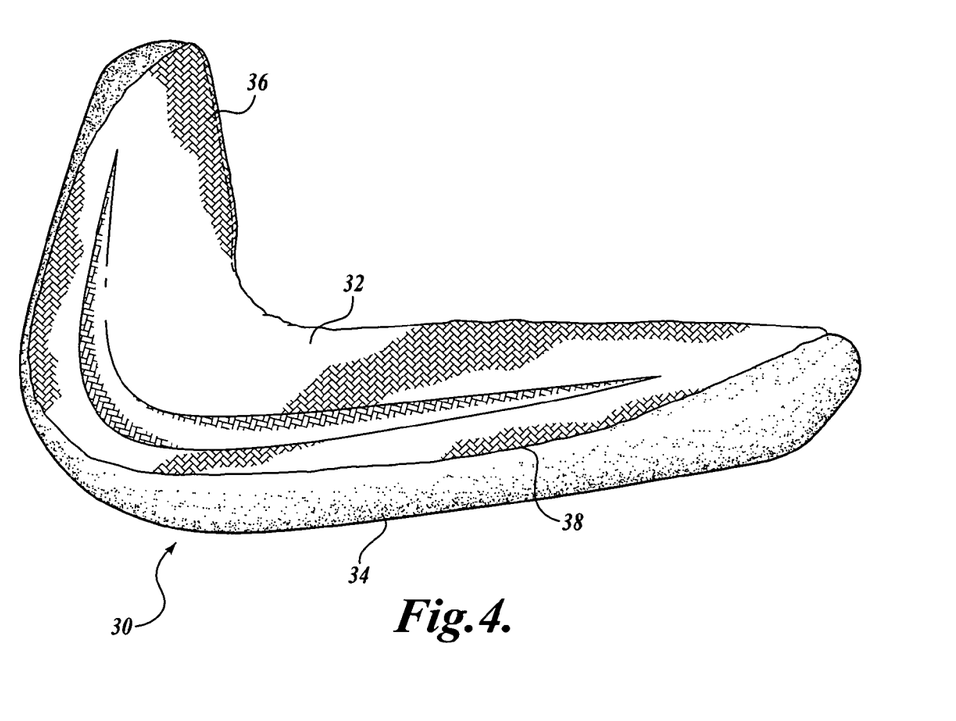
FIG. 4 is a perspective view of a buoyant, boomerang-shaped, flying throw-toy in accordance with a second embodiment of the present invention.
Figure 5:
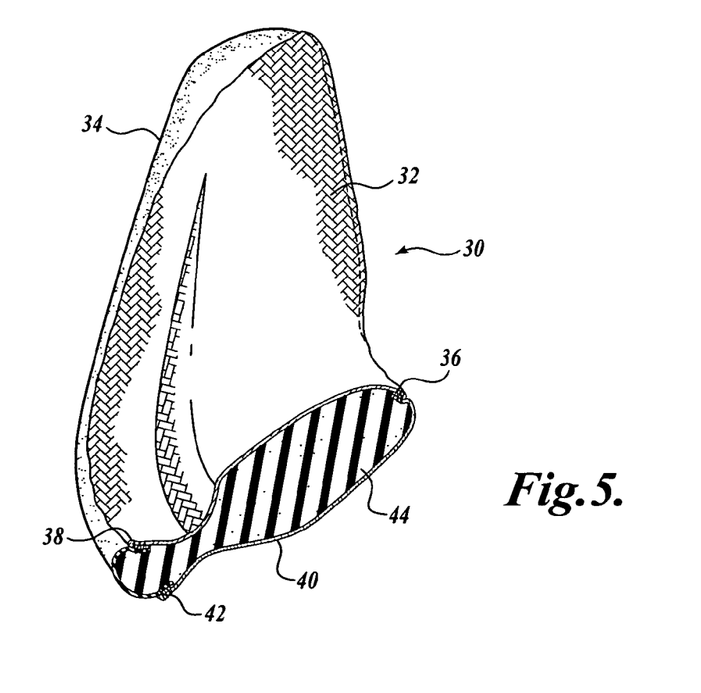
FIG. 5 is a cross-sectional perspective view thereof.

FIG. 4 illustrates a perspective top-side view of the buoyant, boomerang-shaped throw-toy 30 in accordance with the second embodiment of the present invention, wherein the throw-toy comprises a fabric tear-resistant top covering component 32 sewn to both a fabric tear-resistant bottom covering component 40 (illustrated in FIG. 5) and a molded, abrasion-resistant front-side covering component 34 with durable stitchings 36 and 38, respectively. FIG. 5 illustrates a cross-sectional view of the boomerang-shaped throw-toy of the present embodiment wherein the fabric tear-resistant bottom covering component 40 is sewn to both the fabric tear-resistant top covering component 32 and the molded abrasion-resistant front-side covering component 34 with durable stitchings 36 and 42, respectively. Buoyant interior member 44 is completely covered by the sewn fabric and molded covering components 32, 40, and 34 such that none of the buoyant interior member remains uncovered. Adhesion exists between the buoyant interior member 44 and both the fabric tear-resistant top covering component 32 and the molded, abrasion-resistant front-side covering component 34 (adhesive element not shown).

Figures 6, 7:
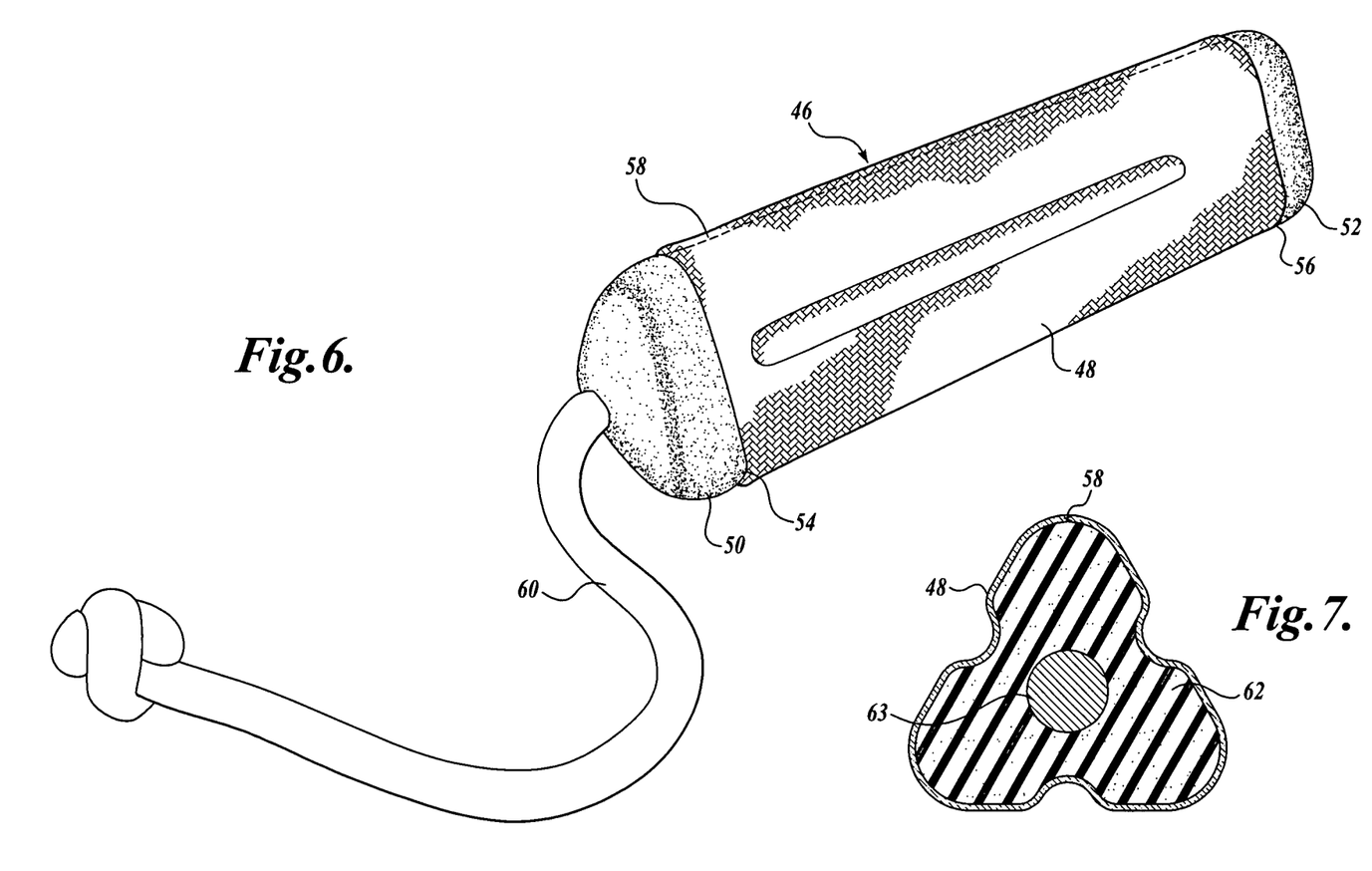
FIG. 6 is a perspective view of a buoyant, boat-fender-shaped, flying throw-toy in accordance with a third embodiment of the present invention.
FIG. 7 is a cross-sectional view thereof.

FIG. 6 illustrates a perspective view of the buoyant, boat-fender-shaped, flying throw-toy 46 in accordance with a third embodiment of the present invention, wherein the throw-toy comprises a fabric tear-resistant covering component 48 sewn to two molded abrasion-resistant cap covering components 50 and 52 with durable stitchings 54 and 56. Further, fabric tear-resistant covering component 48 is also sewn to itself with stitchings 58 such that it inherits the three-dimensional shape consistent with the shape of the buoyant interior member 62 (illustrated in FIG. 7). Further, in accordance with one embodiment of the present invention, cap covering component 50 is adaptively affixed to rope 60 to more precisely resemble a traditional boat-fender object. FIG. 7 is a cross sectional view of the boat-fender-shaped throw-toy of the present embodiment wherein the buoyant interior member 62 is illustrated as being covered on all three sides with fabric covering component 48 and on two ends with abrasion-resistant cap covering components 50 and 52, such that none of the buoyant interior member 62 remains uncovered. In accordance with one embodiment of the present invention, the buoyant interior member 62 contains an elongate weighted element 63 to allow for more thrust when the throw-toy 46 is thrown with a forward spinning force. This additional weight helps to compensate for a lesser aerodynamic design. Adhesion may exist between the buoyant interior member 62 and both the fabric tear-resistant top covering component 48 and the elongate weighted element 63 (adhesive element not shown).

The three embodiments disclosed above similarly comprise the following three primary components: at least one fabric tear-resistant covering component, at least one molded abrasion-resistant covering component, and at least one buoyant foam interior member. These components are configured in such a way as to maximize gyroscopic stability, impact-resistance, grip, and graspability for each distinct object shape of the first three embodiments. Each object shape is symmetrical about an imaginary central axis and is configured to rotate about said imaginary central axis when thrown with a forward spinning force. In accordance with the illustrated configurations of the first three embodiments, several alternative shapes can be realized while still maintaining the same material and design advantages described above.

Figure 8:
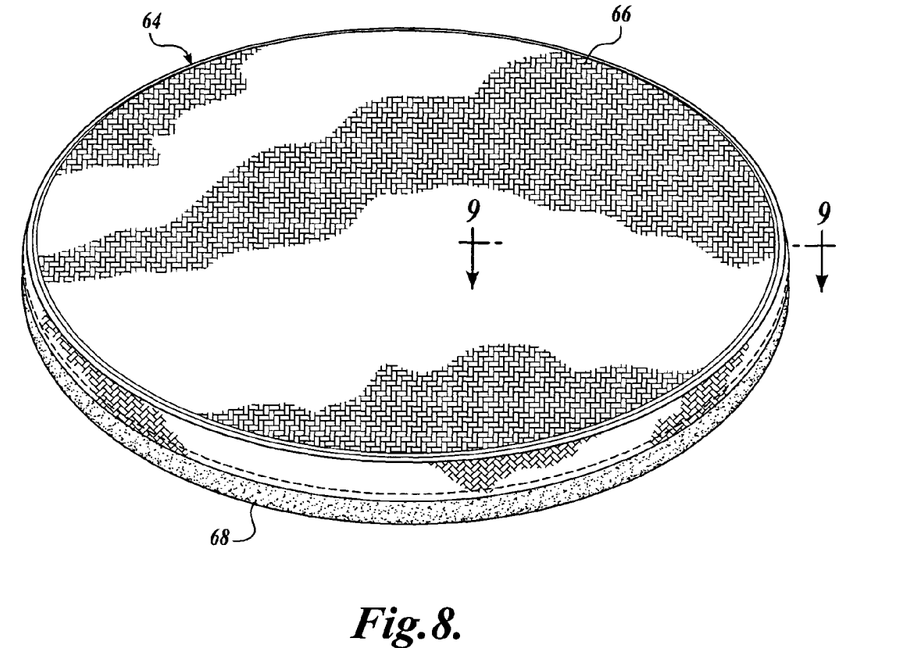
FIG. 8 is a perspective view of a buoyant, disc-shaped, flying throw-toy in accordance with an alternate embodiment of the present invention.
Figure 9:
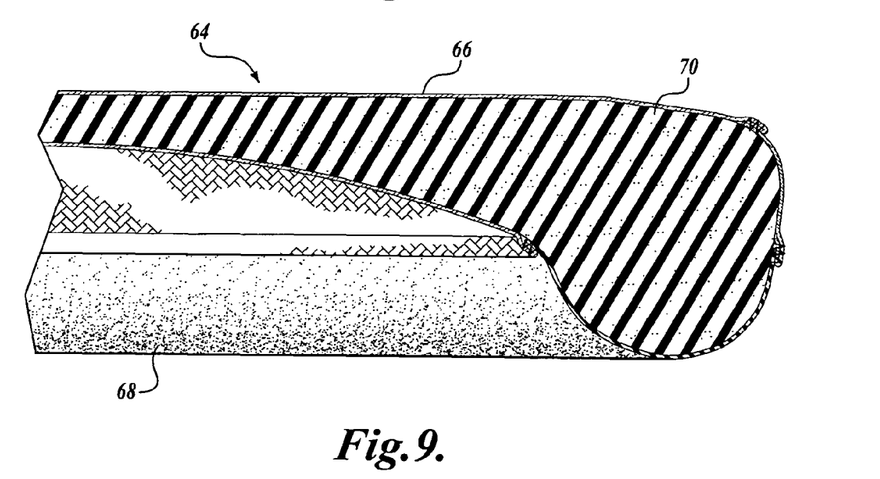
FIG. 9 is a partial cross-sectional view thereof.
Figure 10:
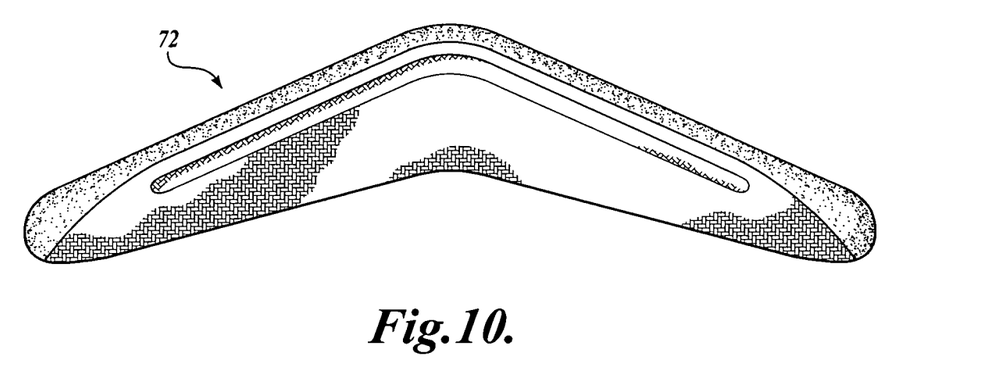
FIG. 10 is a front-side view of a buoyant, boomerang-shaped, flying throw-toy in accordance with an alternative embodiment of the present invention.

For example, the disc-shaped throw-toy 64, illustrated in FIGS. 8-9, has substantially the same shape and component placement as the ring-shaped throw-toy, illustrated in FIGS. 1-3. In these similar embodiments, the molded components 16 and 68 are placed on the bottom-side of the object shapes, around the peripheral edge of the buoyant interior member 28 and 70, respectively, to maximize gyroscopic stability and flight time. It should be understood that the molded components 16 and 68 in the embodiments of the present invention are of a higher proportional weight than those of the fabric components 12 and 66 and foam components 28 and 70. This weighted bottom-edge rim placement is beneficial for extended flight time because fabric and foam components alone lack sufficient weight to give proper thrust to the throw-toy object shapes 10 and 64 when a forward spinning force is applied.

Figure 11:
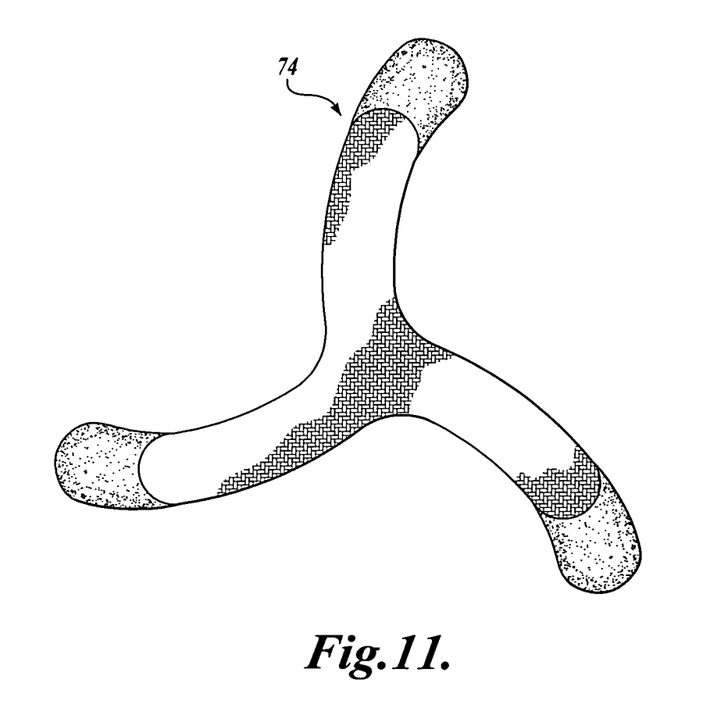
FIG. 11 is a front-side view of a buoyant, boomerang-shaped, flying throw-toy in accordance with an alternative embodiment of the present invention.
Figure 12:
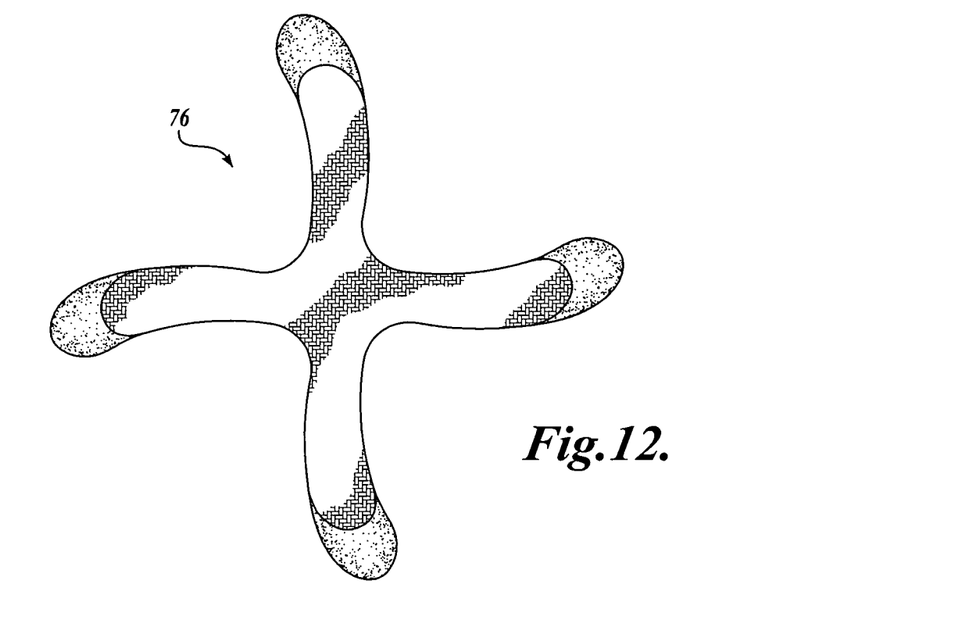
FIG. 12 is a front-side view of a buoyant, boomerang-shaped, flying throw-toy in accordance with an alternative embodiment of the present invention.
Figure 13:
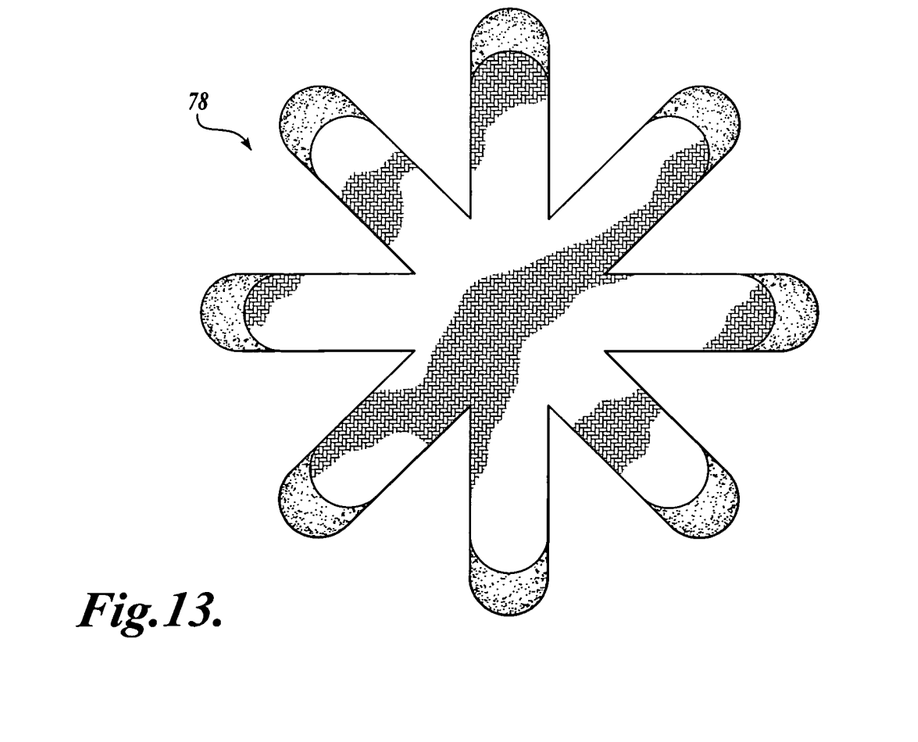
FIG. 13 is a front-side view of a buoyant, boomerang-shaped, flying throw-toy in accordance with an alternative embodiment of the present invention.

Likewise, the alternative boomerang-shaped throw-toys 72-78, illustrated in FIGS. 10-13, have similar shape and component placement to the boomerang-shaped throw-toy, illustrated in FIGS. 4-5, with the exception that the alternative boomerang shapes in FIGS. 11-13 have a higher number of elongate side members. The boomerang illustrated in FIG. 10 has a V-type shape particularly similar to that of the V-type boomerang depicted in FIGS. 4-5, with the exception that the degree of bend is lesser and the length of the elongate side members is greater. This shape is particularly suited to extended flight time. In each of these additional embodiments, the molded components are placed along the peripheral edge of the elongate side members in order to maximize gyroscopic stability and flight-time.

Figure 14:
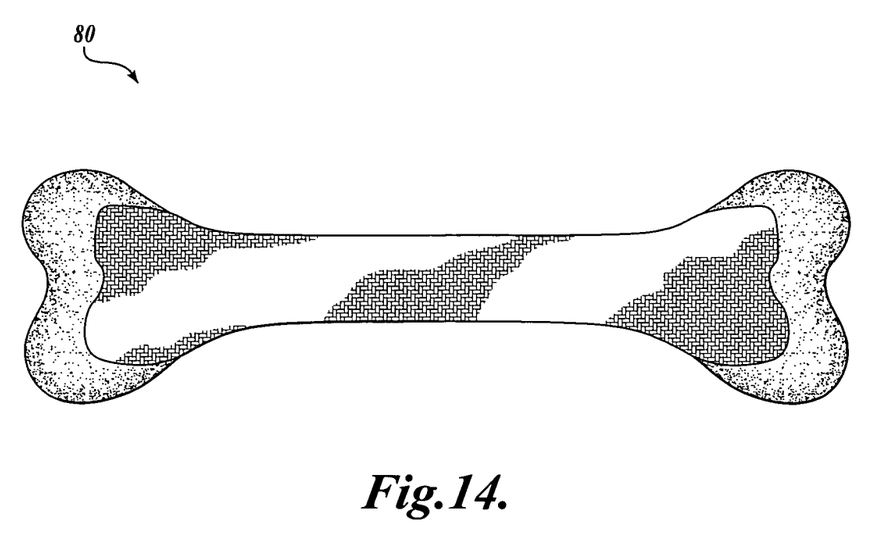
FIG. 14 is a front-side view of a buoyant, bone-shaped, flying throw-toy in accordance with an alternative embodiment of the present invention.

The alternative to the boat-fender-shaped throw-toy, illustrated in FIGS. 6 and 7, is the bone-shaped throw-toy 80 illustrated in FIG. 14. Both the boat-fender and the bone throw-toys are configured to, be thrown from one molded end such that the throw-toy gyroscopically spins about an imaginary central axis when thrown. Similar to the boat-fender-shaped throw-toy, in one embodiment of the present invention, the buoyant interior member of the bone-shaped throw-toy also contains an elongate weighted element to allow for more thrust when the lesser aerodynamic shape is thrown.

The present invention provides for a superior flying throw-toy which is both buoyant and durable. In each illustrative embodiment discussed above, the throw-toy shape takes flight and spins about an imaginary central axis when a forward spinning force is applied to a peripheral edge of the object shape. Whether an animal retrieves the throw-toy in air, on water, or on the ground, the easily graspable exterior surface coverings make the toy ideal for a game of fetch. While illustrative embodiments have been illustrated and described in detail, it should be understood that various material and shape changes can be made herein without departing from the spirit and scope of the present invention.

The embodiments of the invention in which an exclusive property or privilege is claimed are defined as follows:

1. A throw-toy of resilient construction, comprising:
   a buoyant interior component configured in the form of a ring, the buoyant interior component having a peripheral edge portion;
   a fabric assembly comprising a plurality of fabric components covering an upper surface and an inner portion of a lower surface of the buoyant interior component, wherein the fabric assembly defines an inner flange; and
   a molded component, wherein the molded component has the property of fold-recovery such that if the molded component is folded over onto itself with a folding force, the molded component will return to an original shape when the folding force is removed, the molded component also covering an outer portion of the lower surface of the buoyant interior component and comprising one of a natural rubber and a synthetic rubber, and further wherein the molded component is adhesively attached to the buoyant interior component and extends around the peripheral edge portion wherein the fabric component and the molded component together completely enclose the buoyant interior component;
   wherein the buoyant interior component exhibits deformation-recovery, whereby the deformation-recovery of the buoyant interior component reinforces the fold-recovery of the adhesively attached molded component;
   wherein the throw-toy is configured to be foldable; and
   wherein the molded component has a higher proportional weight than the fabric component and the buoyant interior component to gyroscopically stabilize the distinct object shape of the buoyant interior component when thrown.

2. The throw-toy of claim 1 wherein the fabric components are formed from a woven material which is tear-resistant and the molded component is an elastomeric material which is abrasion-resistant.

3. The throw-toy of claim 2 wherein the elastomeric material of the molded component is elastic enough to facilitate folding the throw-toy, without tear or permanent deformation of the molded component.

4. The throw-toy of claim 1 wherein the fabric components are formed from a non-woven material which is tear-resistant and the molded component is an elastomeric material which is abrasion-resistant.

5. The throw-toy of claim 4 wherein the molded component is elastic enough to facilitate folding the throw-toy, without tear or permanent deformation to the molded component.

6. The throw-toy of claim 1 wherein the buoyant interior component is formed from closed-cell foam of uniform density.

7. The throw-toy of claim 1 wherein the fabric components and the molded component are adhesively affixed to the buoyant interior component.

8. A resilient throw-toy adapted to be thrown by a user for retrieval by an animal, the throw-toy being constructed to withstand the repetitive biting force of an animal's teeth, comprising:
   a. a buoyant closed-cell foam interior component configured in the form of a ring and having a peripheral edge portion;
   b. a tear-resistant fabric component covering an upper surface and an inner portion of a lower surface of the foam interior component, wherein the fabric component defines an inner flange; and
   c. a molded component comprising one of a natural rubber and a synthetic rubber adhesively attached to the peripheral edge portion of the foam interior component wherein the molded component extends around the peripheral edge portion and the fabric component and the molded component together completely enclose the interior component, said molded component being abrasion-resistant to withstand impact, puncture-resistant to withstand the biting force of an animal's teeth, wherein the molded component has a higher proportional weight than the fabric component and the foam interior component, and further wherein the molded component has the property of fold-recovery such that if the molded component is folded over onto itself with a folding force, the molded component will return to an original shape when the folding force is removed;
   wherein the throw-toy is configured to be foldable; and
   wherein the foam interior component exhibits deformation-recovery, whereby the deformation-recovery of the foam interior component reinforces the fold-recovery of the adhesively attached molded component.

9. The resilient throw-toy of claim 8 wherein the fabric component is a woven material and the molded component is an elastomeric material.

10. The resilient throw-toy of claim 8 wherein the fabric component is a non-woven material and the molded component is an elastomeric material.

11. The resilient throw-toy of claim 8 wherein the fabric component, the molded component, and the foam interior component, when joined, are configured in a circular shape.

12. The resilient throw-toy of claim 8 wherein both the fabric component and the molded component are adhesively affixed to the foam interior component.

* * * * *